(12) United States Patent
Virtanen

(10) Patent No.: US 6,229,724 B1
(45) Date of Patent: May 8, 2001

(54) POWER SUPPLY CIRCUIT FEATURING SECONDARY SIDE MICROCONTROLLER FOR CONTROLLING A PRIMARY SIDE POWER FACTOR CORRECTION CIRCUIT

(75) Inventor: Hannu Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/461,491

(22) Filed: Dec. 14, 1999

(51) Int. Cl.[7] .................................................. H02M 7/217
(52) U.S. Cl. ................................... 363/89; 363/37
(58) Field of Search .................................. 363/34, 37, 84, 363/89

(56) References Cited

U.S. PATENT DOCUMENTS

| | | | |
|---|---|---|---|
| 5,694,311 | * 12/1997 | Umeda et al. | 363/89 |
| 5,726,871 | * 3/1998 | Choi | 363/89 |
| 5,910,891 | * 6/1999 | Jo | 363/89 |
| 6,031,748 | * 2/2000 | Hong | 363/89 |

FOREIGN PATENT DOCUMENTS 0673106  9/1995  (EP)  ............................. H02M/3/335

OTHER PUBLICATIONS

"TDA 4862" Datasheet, Technical Disclosure, by Siemens, dated Feb. 16, 1998, pp. 4–8.

* cited by examiner

*Primary Examiner*—Jeffrey Sterrett
(74) *Attorney, Agent, or Firm*—Ware, Fressola, Van Der Sluys & Adolphson LLP

(57) ABSTRACT

A display monitor power supply circuit has a primary side with a power factor correction circuit, a secondary side with a microcontroller for controlling a display monitor, and an isolation interface arranged between the primary side and the secondary side. The microcontroller provides a power correction circuit control signal to the power factor correction circuit for controlling a power correction factor of the display monitor power supply circuit. In operation, the power correction circuit control signal automatically switches the power factor correction circuit to an off state during a power save state. The isolation interface may also provide a supply voltage directly to the power factor correction circuit. The isolation interface may include an isolator circuit for two-way communication signals between the primary side and the microcontroller to fully control the power factor correction circuit.

24 Claims, 9 Drawing Sheets

| FIG.1A |
|--------|
| FIG.1B |

| FIG.2-1 |
|---|
| FIG.2-2 |

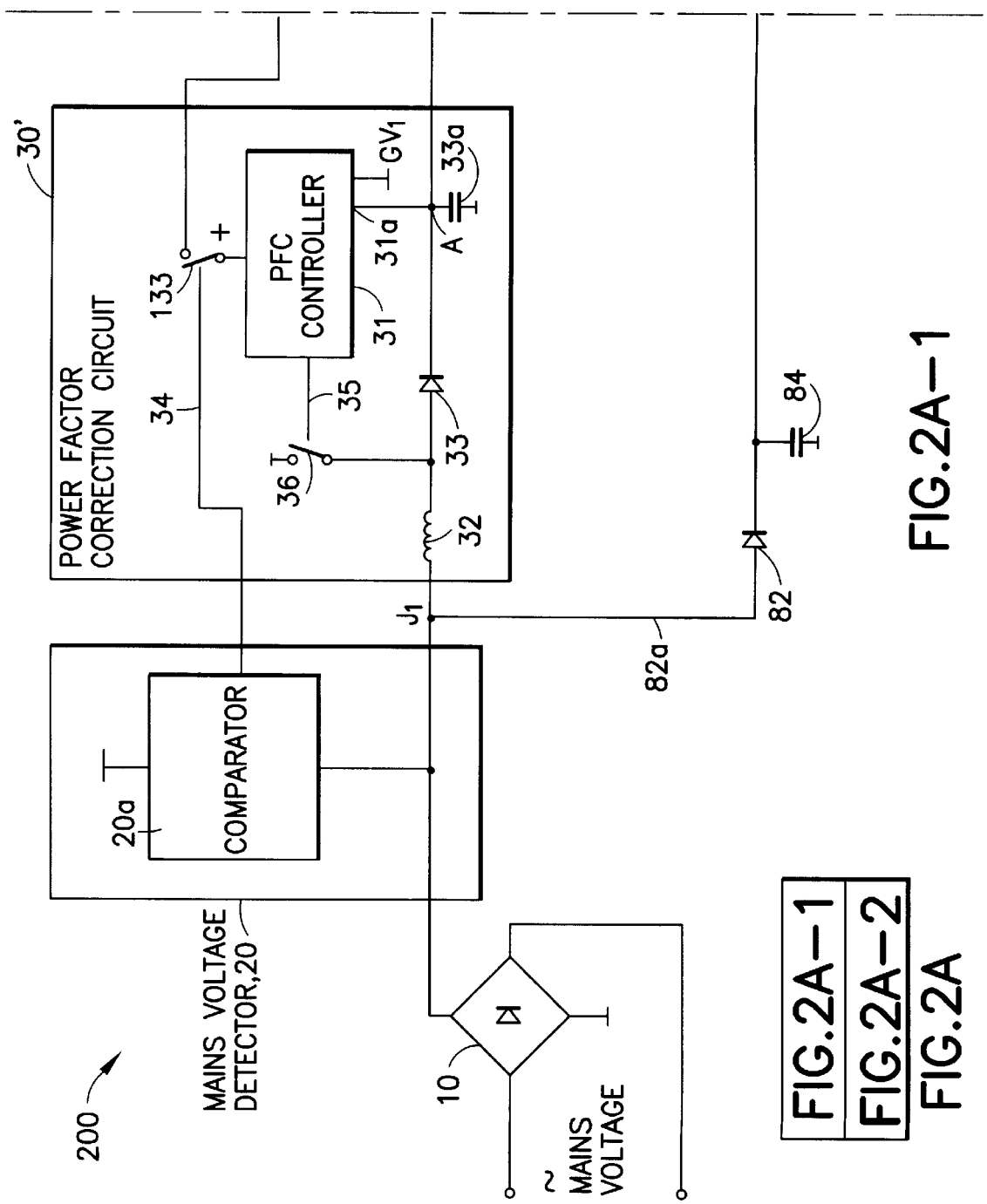

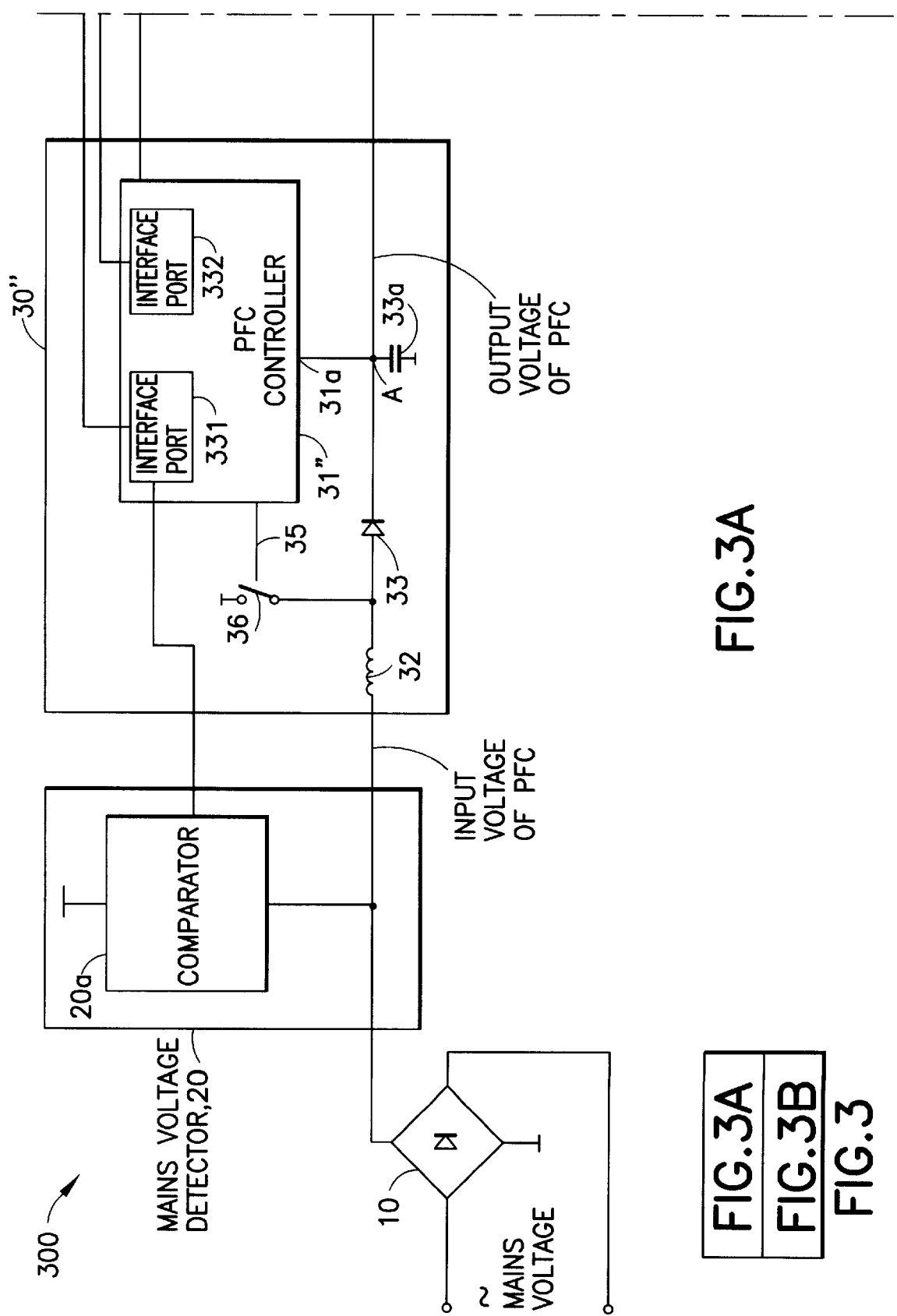

POWER SUPPLY CIRCUIT FEATURING SECONDARY SIDE MICROCONTROLLER FOR CONTROLLING A PRIMARY SIDE POWER FACTOR CORRECTION CIRCUIT

BACKGROUND OF THE INVENTION

1. Field of Invention

The present invention relates to a power supply for a display monitor; and more particularly relates to a high efficiency Switching Mode Power Supply (SMPS) apparatus with a Power Factor Correction circuit (PFC).

2. Description of Related Art

Traditionally, a PFC circuit is used in devices with high wattage, which improves the power of an alternating-current transmission system so the voltage and the current are substantially in phase. But an increasing number of personal computers (PCs) having display monitors provide a remarkable potential for saving power by equipping the display monitors with a PFC circuit. Display monitors may also include other display devices which can be connected to a mains voltage and based for instances on cathode ray tube, liquid crystal or projection type display technology.

It is known in the art to use a separate PFC circuit between a mains outlet and a power consuming device. For example, EP 0 673 106 A1 discloses circuits for achieving a higher power factor in a switched mode power supply. FIG. 2 of EP 0 673 106 A1 shows a circuit having a step-up regulator arranged between a bridge-type rectifier and an AC energy distribution source that includes a capacitor C, a transformer M, a controller CTRL1, a switch S1, a diode D2 and a capacitor C2. One disadvantage in the related art is that the PFC circuit is always ON when main voltage is available. The reader is also referred to a technical disclosure by Siemens identified as the TDA 4862 datasheet.

It is also known in the art to add a PFC module, as such, inside a housing of such a power consuming device.

There is a need in the art to develop a cooperation between a display monitor and a PFC circuit in order to improve the efficiency of a power supply and power saving.

Moreover, many display monitors have a universal power supply, i.e., the same power supply is able to operate with a large value of the mains voltages for instance in US (110V) and in Europe (230V). Display monitors also have power saving properties. Display monitors are automatically switched to a power save state after inactivity of the user.

There is a need in the art to: (1) equip such display monitors power supplies with a PFC circuit which are also universal, i.e., properties of a PFC circuit are controlled according to the operating situation; (2) make a PFC circuit controllable according to mains voltage of display monitor; (3) make a PFC circuit controllable according to power consuming of a display monitor; and (4) find an economical solution where additional control circuitry for the PFC circuit is minimized by sharing an existent display controller for controlling power factor correction.

Moreover, PFC circuits known in the art provide a load with a fixed and regulated voltage that equals the mains voltage type. Regulated PFC output voltage is typically 400V in Europe (mains 230V) and 230V in US (mains 110V). In the art, universal monitors which cover both mains voltage types are working typically with a mains voltage range of 90V, . . . , 265V. The problem with fixed regulated PFC output voltages is the voltage gap between input voltage (the mains voltage) and output voltage. High voltage gap with high peak currents in inductor and switch increases losses in those components. Minimizing the voltage gap decreases losses in the inductor, switch and rectifier. This would allow a smaller and lighter inductor and switch, which would result in cost reductions.

FIG. 1

A Basic Display Monitor Power Supply Circuit

In particular, FIG. 1 shows a basic display monitor power supply circuit generally indicated as 5, which includes a mains rectifier 10, a power factor correction circuit 30, a main power supply 40, a standby power supply 50, deflection circuits 60, 70, a microcontroller 90, a display user interface 100 and circuits 110 in addition to microcontroller 90 which are switched on during the power save mode.

The mains rectifier 10 provides a mains rectifier signal having a current and voltage having a certain phase relationship.

The power factor correction circuit 30 includes a PFC controller 31, an inductor 32, a diode 33, a capacitor 34, a control line 35 and a switch 36. The PFC circuit 30 and also the PFC controller 31 are known in prior art. See the supply voltage generation in Siemens' FIG. 3 of the TDA 4862 datasheet, which is a known prior art method. The PFC controller 31 monitors both the incoming full-wave rectified mains voltage and the voltage in the capacitor 33a. The product of these voltages is used to control the pulse ratio of the switch 36 so that the waveform of the current drawn from the mains corresponds to the waveform of the voltage. In FIG. 3 of Siemens+ TDA 4862 datasheet, there is no external circuit controlled power supply generation. In FIG. 1, the combination of a transformer 37, a diode 38 and a capacitor 39 provides for the voltage generation to the PFC circuit 30. In operation, the alternating flux of the coil 32 induces alternating voltage in the transformer 37, which is rectified by the diode 36 and filtered by capacitor 39. One disadvantage of the display monitor power supply circuit 5 is that, when the standby state is activated by setting a switch to a continuous open state, the PFC controller 31 is still consuming power.

The main power supply 40 includes a switching mode power supply (SMPS) controller 41, a transformer ($T_1$) 42, a switch 43, a feedback loop 44, an isolator ($I_1$) 45, diodes 46a, 46b, 46c, a feedback resistor 47 and a reference voltage diode 48. The feedback loop is connected to a standby state control line 44a from the microcontroller 90. All of these circuit components are all known in the art, the scope of the invention is not intended to be limited to any particular type thereof, and a person skilled in the art would appreciate how they cooperate to provide a main power supply. The function of the main power supply 40 will be explained in more detail below and further in relation to the description of FIGS. 2–4 below.

The standby power supply 50 includes a switching mode power supply (SMPS) controller 51, a transformer ($T_1$) 52, a switch 53, a standby state feedback loop 54, an isolator ($I_1$) 55, a diode 56, a feedback resistor 57 and a reference voltage diode 58. All of these circuit components are all known in the art, the scope of the invention is not intended to be limited to any particular type thereof, and a person skilled in the art would appreciate how they cooperate to provide a standby power supply. The function of the standby power supply 50 will be explained in more detail below and further in relation to the description of FIGS. 2–4 below.

In operation, the SMPS controllers 41, 51 control energy supplied to primary windings of the transformers 42, 52 by switches 43, 53, which are preferably Field Effect Transistors (FETs). The SMPS controllers 41, 51 can control, for instance, switching frequency and/or duty cycle. Feedback along lines 44, 54 from the secondary side of transformers 42, 52 is fed to the SMPS controllers 41, 51 in order to keep rectified secondary voltages V3, . . . , V6 stable. The display monitor circuits 60, . . . , 110 are all fed by the power supply. The switch SW1 is a manual switch to start the power supply. The switch SW3 is used to start the main power supply 40 by means of the standby power supply 50. The switch SW3 is controlled by isolator 45 and control line 44 from the microcontroller 90. During standby, the switch SW4 is closed and circuits 110 are supplied by standby power supply 50. During normal operation, the switch SW4 is open and circuits 110 are supplied by main power supply 40.

Regarding the isolated/non-isolated interface, all parts in a given high wattage device which have galvanic connection to parts which the user can touch must be isolated from the mains voltage. Such isolation is realized with transformers (T1, T2) 42, 52 having adequate isolation between primary and secondary windings. The feedback signals 44, 54 are fed from secondary to primary via isolators (I1, I2), which may be opto-isolators.

The present invention provides a solution to the aforementioned problems in the industry and also fulfills the aforementioned needs in the industry.

SUMMARY OF INVENTION

In particular, the present invention provides a display monitor power supply circuit having a primary side with a power factor correction circuit, a secondary side with a microcontroller for controlling a display monitor, and an isolation interface arranged between the primary side and the secondary side. The invention is characterized in that the microcontroller provides a power correction circuit control signal to the power factor correction circuit for controlling a power correction factor of the display monitor power supply circuit. In operation, the power correction circuit control signal automatically switches the power factor correction circuit to an off state during a power save state. Alternatively, the power factor correction circuit control signal activates the off state during the power save state by switching off the power supply of the power factor correction circuit. In all embodiments shown and described herein, the power factor correction circuit on the primary side is controlled by the microcontroller of the display monitor on the secondary side for performing a power save function. In effect, the microcontroller is a common controller that controls both user interface functions on the secondary side as well as power factor correction circuit functions on the primary side. The whole thrust of the present invention is directed to controlling the power factor correction circuit on the primary side with the microcontroller on the secondary side that also controls secondary side functions like the user interface.

In one embodiment, the isolation interface includes a main power supply circuit that provides a supply voltage to the power factor correction circuit, as well as an isolator circuit that responds to the power correction circuit control signal for switching the main power supply circuit and providing the supply voltage to the power factor correction circuit. The main power supply circuit has a transformer with a winding and includes a diode connected in series with the winding.

The primary side also includes a voltage detector coupled between a mains rectifier and the power factor correction circuit. The voltage detector responds to a main rectifier signal from the main rectifier, for providing a voltage detection control signal. The power factor correction circuit includes a power factor correction controller circuit and a power factor correction switch, which responds to the voltage detection control signal, for providing the supply voltage via the power factor correction switch to the power factor correction controller circuit.

In another embodiment, the isolation interface provides a supply voltage directly to the power factor correction circuit.

In still another embodiment, the isolation interface includes a main power supply circuit that provides the supply voltage to the power factor correction circuit, as well as an isolator circuit that responds to the power correction circuit control signal, for switching the main power supply circuit and providing the supply voltage to the power factor correction circuit. In operation, the primary side may also provide a communication signal to the microcontroller enabling two-way communication between the primary side and the microcontroller on the secondary side to fully control the power factor correction circuit.

The isolation interface may also include an isolator circuit for two-way communication signals between the primary side and the microcontroller to fully control the power factor correction circuit.

One advantage of the present invention is that it develops a cooperation between a display monitor and the power factor correction circuit in order to improve the efficiency of power supply and power saving. The present invention also integrates the power factor correction circuit into a display monitor power supply, controls properties of the power factor correction circuit with the display monitor power supply, and integrates the power factor correction circuit into the display monitor with a universal power supply.

Another advantage of the present invention is that the switching off of the power supply of the PFC controller during the power save state totally breaks the current consumption of all active parts in the PFC circuit.

Moreover, the present invention (1) equips such display monitors power supplies with a power factor correction circuit that is universal, i.e., properties of PFC circuit are controlled according to the operating situation; (2) makes the power factor correction circuit controllable according to mains voltage of display monitor; (3) makes the power factor correction circuit controllable according to power consuming of display monitor; and (4) provides a economical solution where additional control circuitry for the power factor correction circuit is minimized by sharing existent display controller for the power factor correction.

DETAILED DESCRIPTION OF INVENTION

The whole thrust of the present invention described herein is not directed to a power factor correction circuit itself, but how a microcontroller is implemented to control the power factor correction circuit. There are three different difference ways for doing the same discussed below in relation to FIGS. 2–3.

FIG. 2

Figures 1, 1A:
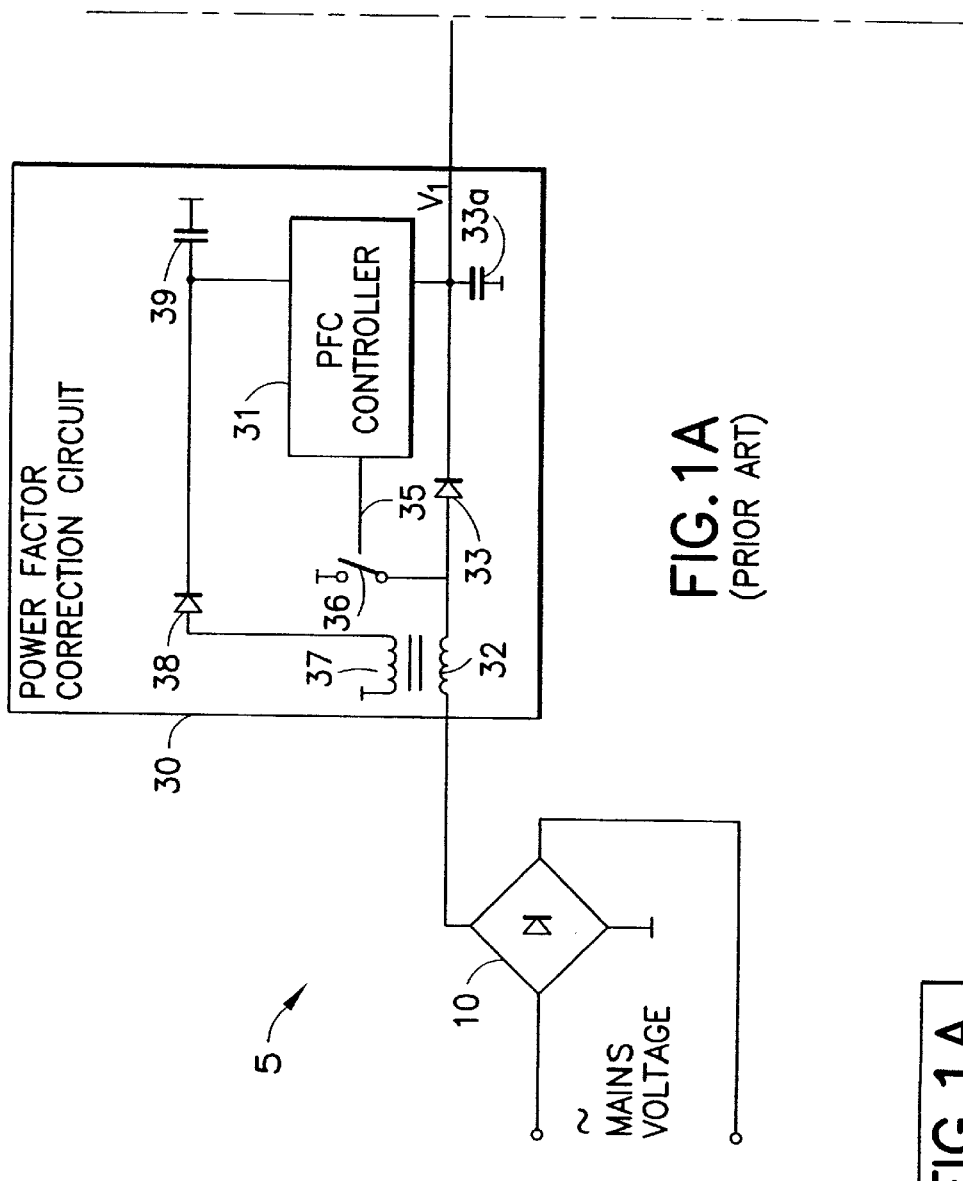
FIG. 1 is a circuit diagram of a basic display monitor power supply circuit.
Figure 1B:
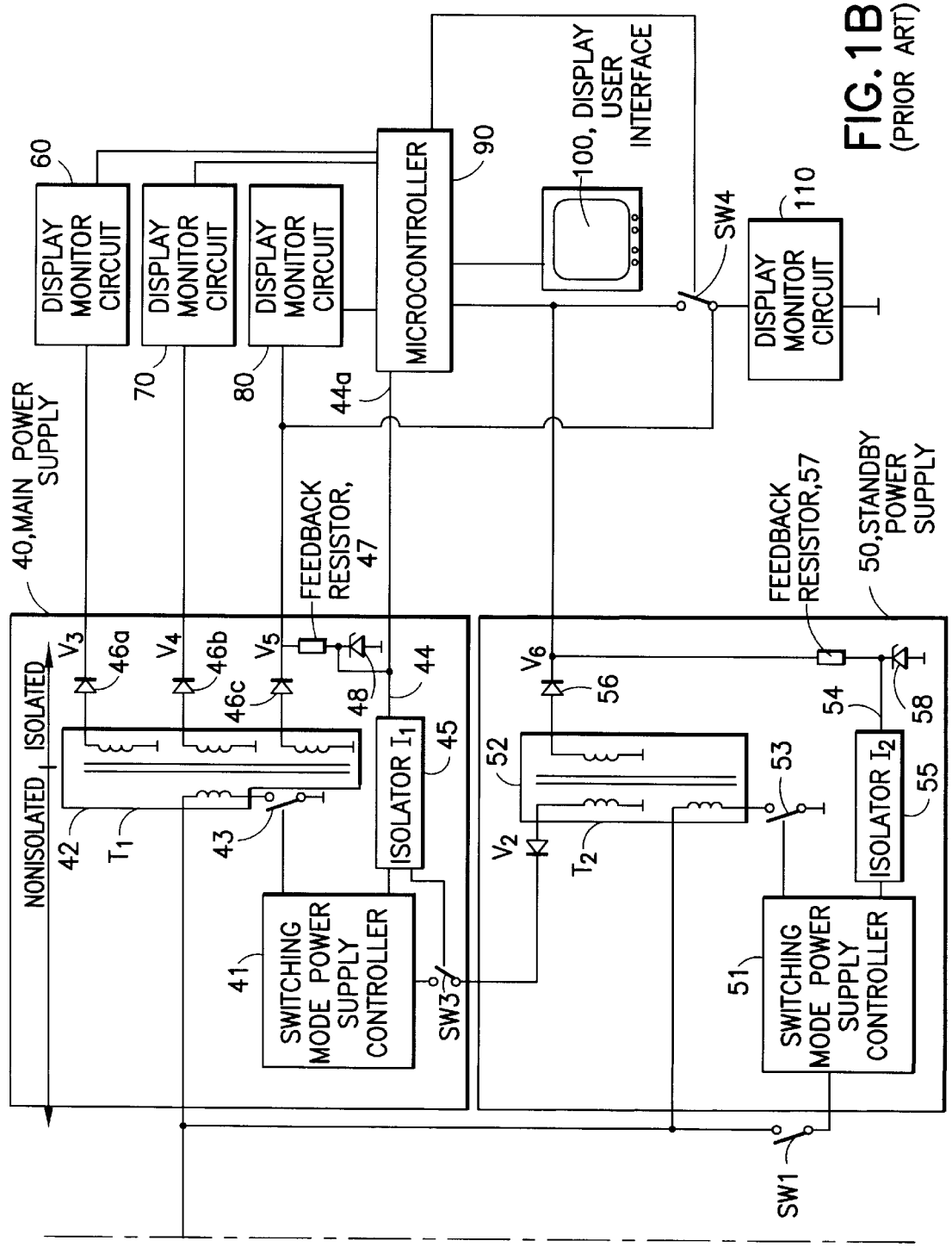
Figures 1, 2:
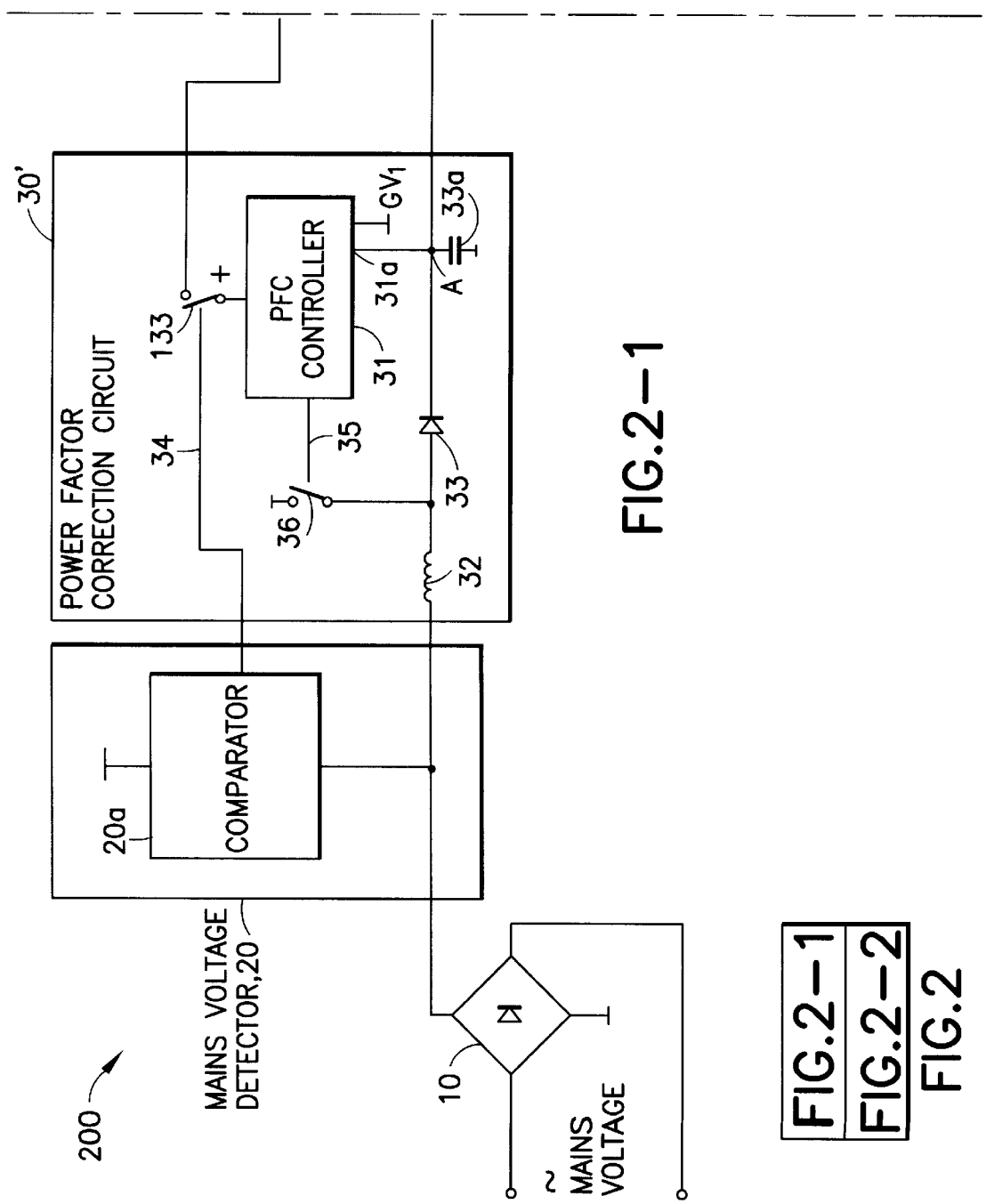
FIG. 2 is a circuit diagram of a first adaptation that is the subject matter of the present patent application to the basic display monitor power supply circuit shown in FIG. 1.
Figure 2:
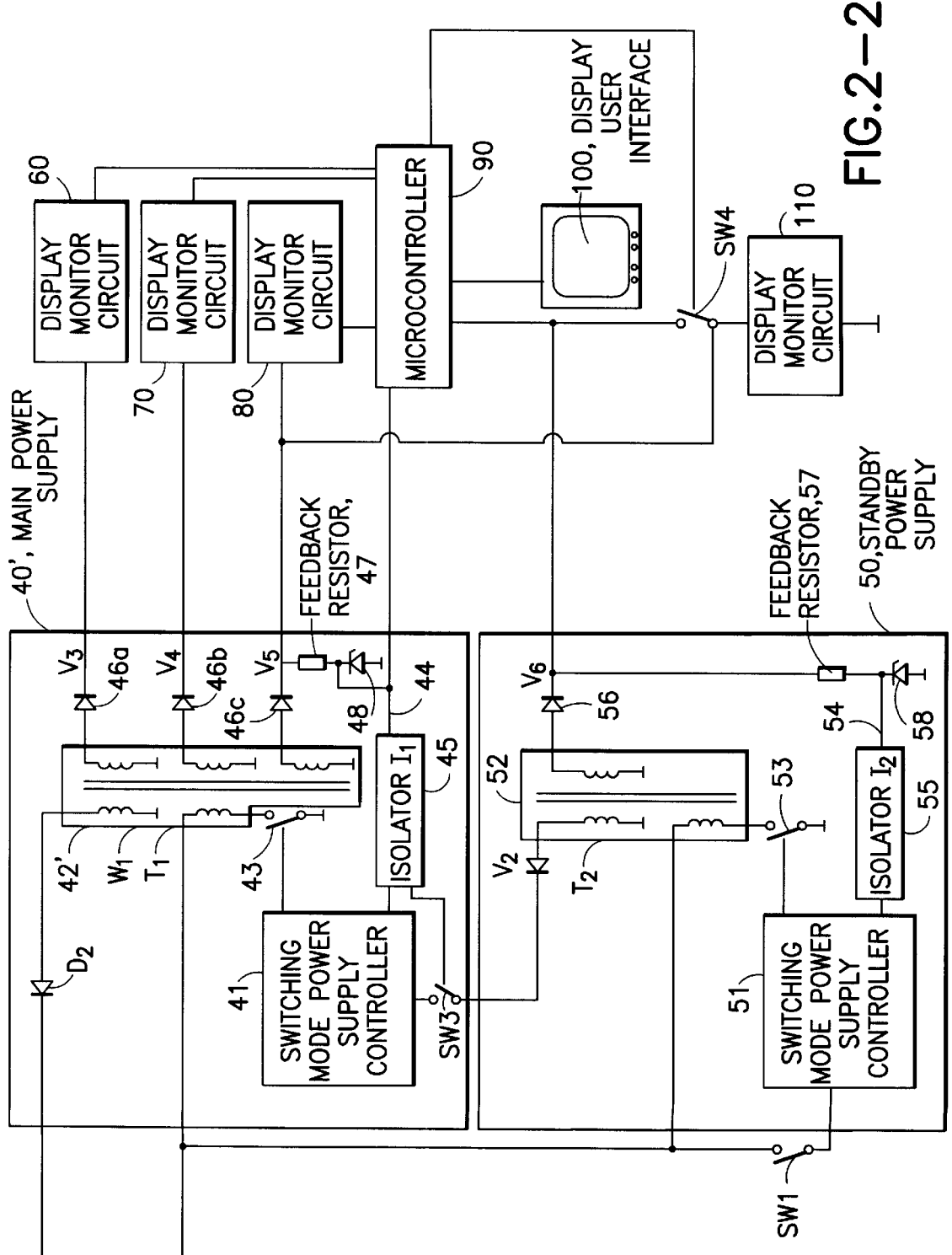

FIG. 2 shows a display monitor power supply circuit generally indicated as 200 for controlling a PFC circuit 30' with a microcontroller 90. In FIGS. 1 and 2, similar elements are labelled with similar reference labels. Moreover, in FIG. 2 the display monitor power supply circuit 200 has a mains voltage detector 20 that includes a comparator 20a. In the main voltage detection 20, the rectified mains is compared to a reference voltage. The state of a control signal 34 depends on the mains voltage level and chosen reference level. Voltages to the comparator 20a can be scaled with resistors from the mains. The reference voltage can be realized for instance with a zener diode.

In FIG. 2 the main power supply 40' includes a winding W1 in the transformer 42' and an additional diode $D_2$, which are effectively added to the primary side of the transformer to bring the supply voltage for the PFC controller 31. In addition, the PFC circuit has a switch 33 connected to the output side of the diode $D_2$, as well as a control line 34 for controlling the switch 133 connected to the mains voltage detector 20. Moreover, in FIG. 2 the voltage $V_1$ is fed at a junction point A directly to the monitor output voltage of the PFC controller 31. The PFC controller 31 also has a connection to ground G.

In operation, when the switch 43 is continuously open, no voltage is induced to secondary windings and winding $W_1$ of the transformer ($T_1$) 42 and the supply voltage of the PFC circuit 30' is switched off. This allows automatic switching of the PFC circuit 30' to an off state during a power save state. In the power save state where power consumption is very low, for example, less than 5 watts, it is recommended to switch off the PFC circuit 30'. When the display monitor 100 is in the power save state, the main power supply 40' is switched off and only standby power is on. From the line 44a, the microcontroller 90 provides a control signal on the feedback loop line 44 to the SMPS controller 41 of the main power supply 40' for switching the main power supply off by setting the switches SW3 and 43 to an open position (as shown).

When no supply voltage is present to the PFC controller 31, the PFC switch 36 is opened by the control line 35. The advantage of this approach is that no control power save state related to the control signal generation is needed on primary side of the power supply, and the PFC circuit 30' is controlled on the secondary side by the microcontroller 90. No extra isolator is needed to feed a supply voltage control to the primary side. A further advantage is that the PFC circuit 30' is switched OFF in fault situations, where the power supply is switched OFF or the user has switched the display monitor off by switch SW1.

In this embodiment, the PFC circuit 30' is switched ON only within a certain mains voltage range. The main voltage detector 20 monitors the voltage from the mains rectifier 10. When the mains voltage rises above a certain value, for instance 190V, the mains voltage detector 20 provides the control signal 34 that switches the PFC supply voltage ON via the switch 133, enabling the PFC circuit 30'. Correspondingly, the PFC supply voltage is switched OFF when the mains voltage drops down, for instance, below 170V. The mains voltage detector 20 preferably has hysteresis to stay ON down to 170V.

Note, even if the PFC circuit 30' is switched OFF below 170V, it is not bypassed. The series inductor 32 has a slight smoothing effect, and it acts as a filter preventing spurious signal to be fed from the SMPS power supplies 40, 50 to the mains network.

In another embodiment, the supply voltage can be fed directly to a supply voltage pin of the PFC controller 31, without the switch 133.

FIG. 2A

Figures 2, 2A:
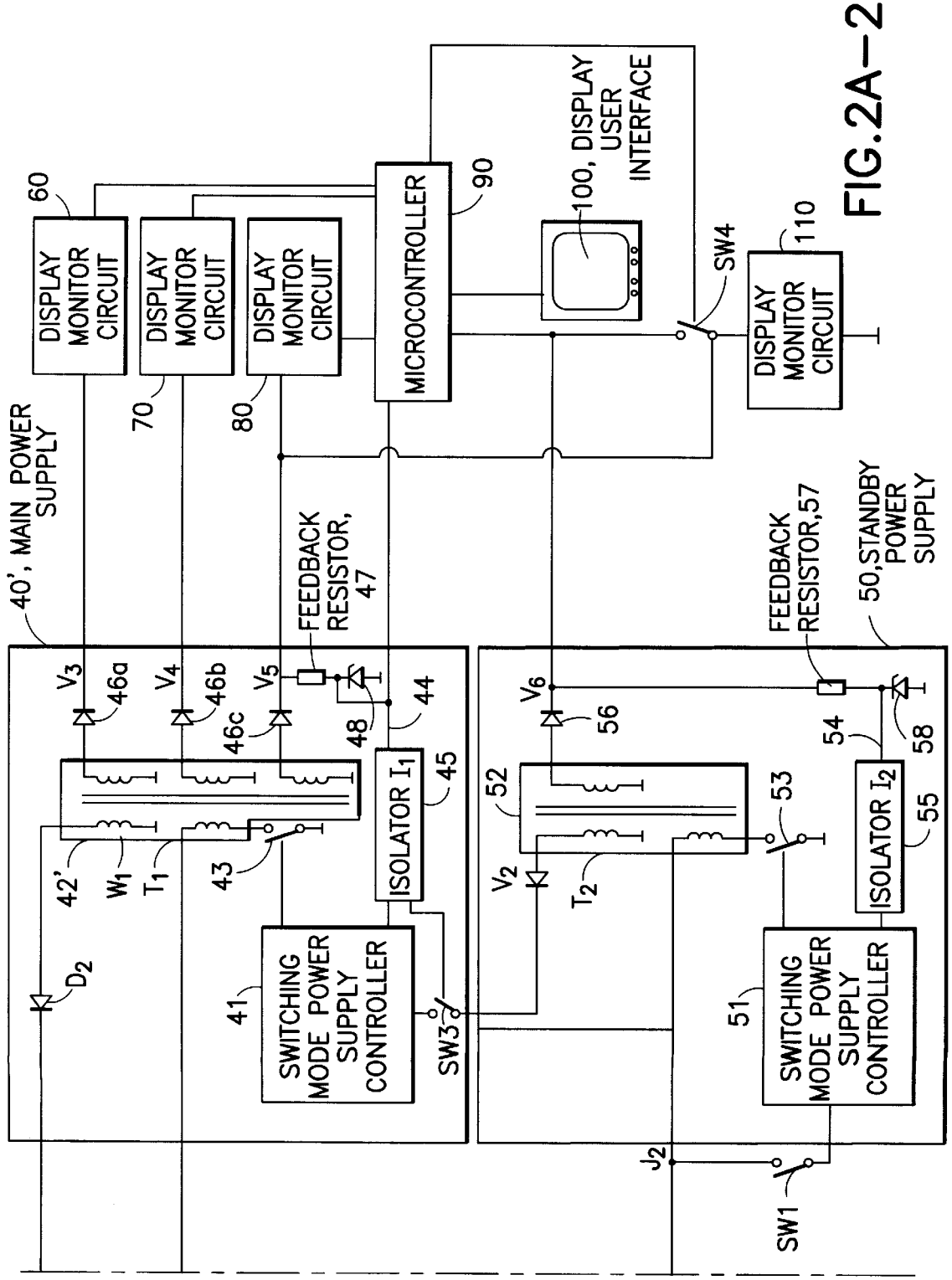
FIG. 2A is a circuit diagram of a second adaptation that is the subject matter of the present patent application to the basic display monitor power supply circuit shown in FIG. 1.

FIG. 2A is an alternative supply voltage arrangement to the standby power supply 50. In FIG. 2A, a line 82a is connected between junction points $J_1$ and $J_2$ to switch SW1. The line 82a has a diode 82 and a capacitor 84. (In FIG. 2A, the line from the junction point $V_1$ is cut of from the standby power supply 50 when compared to the embodiment in FIG. 2.) Because the PFC circuit 30 is not needed in the standby mode, it is possible to feed the power supply directly from the rectified voltage mains 10 as shown in FIG. 2A.

FIG. 3

A Universal Embodiment

Figure 3B:
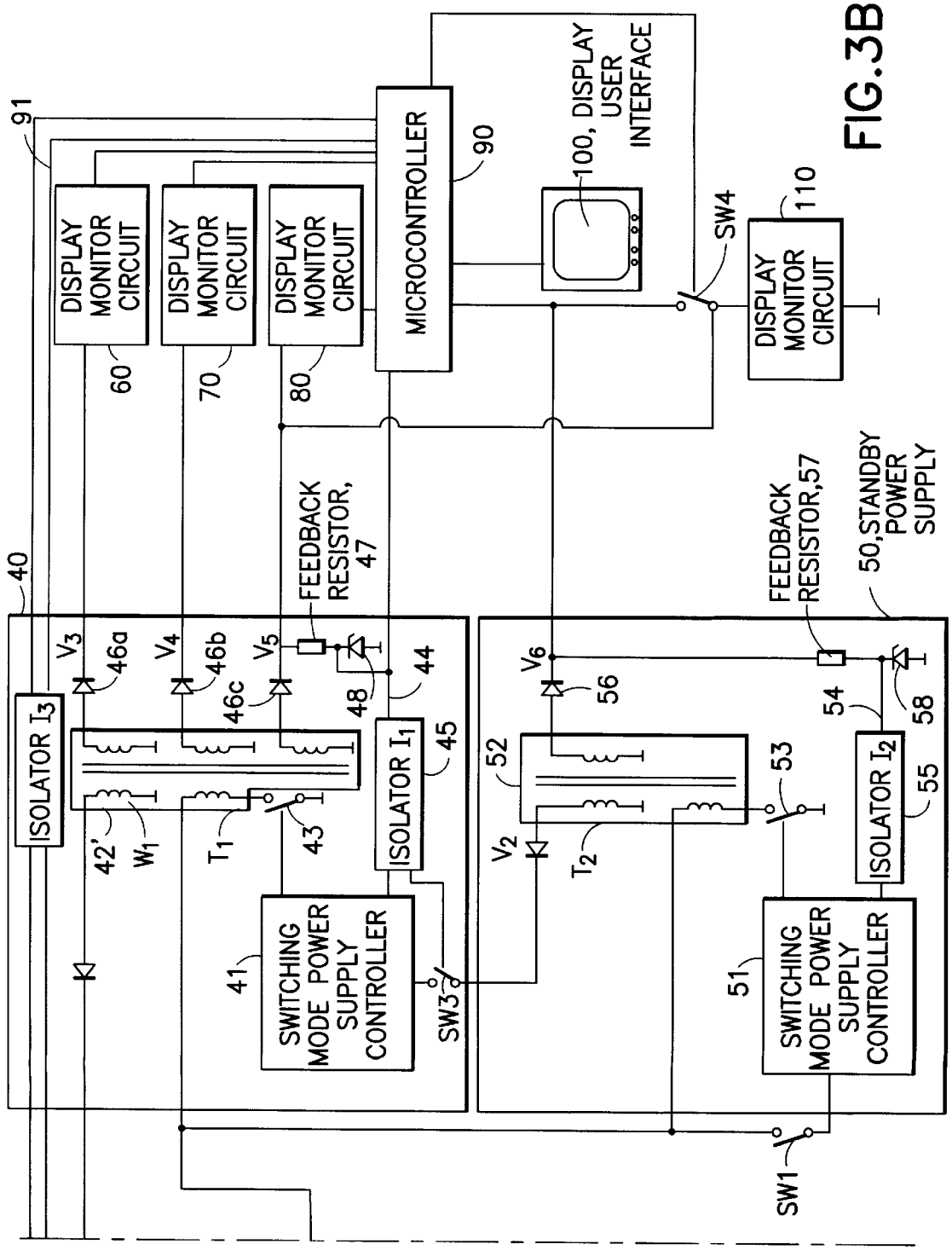
FIG. 3 is a circuit diagram of a third adaptation that is the subject matter of the present patent application to the basic display monitor power supply circuit shown in FIG. 1.

FIG. 3 shows a display monitor power supply circuit generally indicated as 300 which is a more universal embodiment for controlling the PFC circuit 30" with the microcontroller 90. In FIGS. 1, 2 and 3, similar elements are labelled with similar reference labels.

In FIG. 3, the main power supply 40 has an additional isolator I3 to enable two-way communication between the PFC/voltage detector 20' on the primary side and the display monitor controller 90 on the secondary side to fully control the PFC circuit 30 properties with the display monitor controller 90. In addition, the PFC controller 31' has an interface port 331 and an interface port 333. The port 331 is used to send sensed or monitored parameters from the PFC controller 31 and the voltage detector 20 to the microcontroller 90. The port 332 receives instructions from the microcontroller 90.

Figure 4:
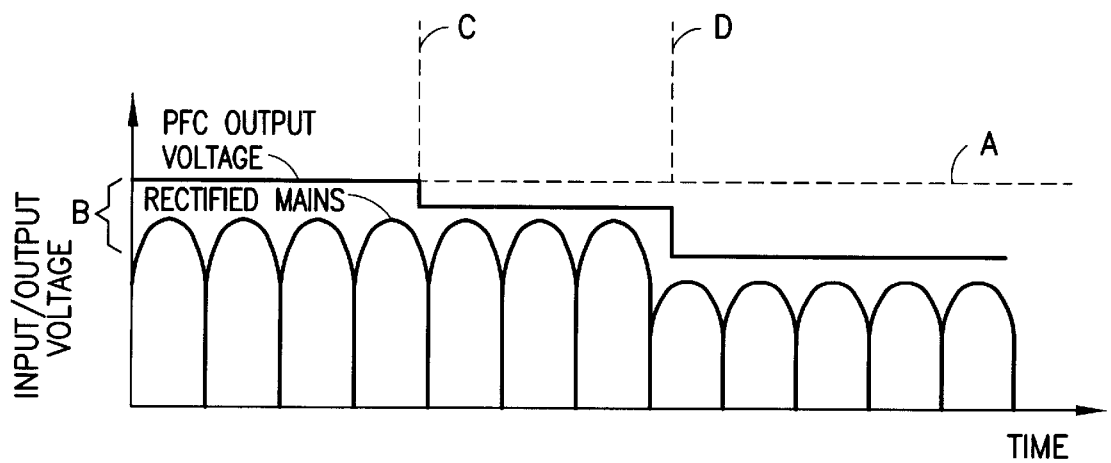
FIG. 4 is a graph of input/output voltages (no units) versus time (no units).
Figure 5:
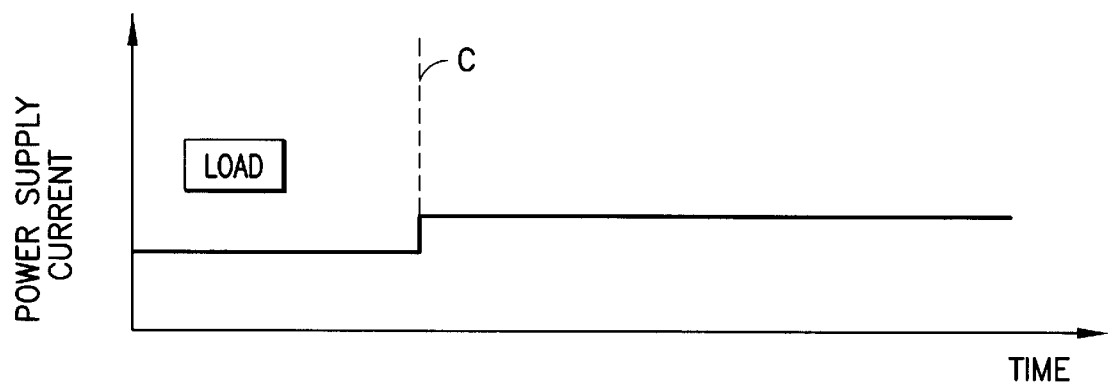
FIG. 5 is a graph of a power supply current (no units) versus time (no units).

In this embodiment, it is possible to use the PFC circuit 30" as a preconverter-type PFC having an output voltage that is not fixed but varies according to mains voltage at a given input power and reduces the PFC input-output voltage. See FIGS. 4–5. FIG. 4 shows the PFC output DC voltage and the rectified mains voltage. In FIG. 4, the reference letter A indicates the traditional PFC circuit output voltage, which does not respond to a change in the input voltage of the PFC circuit (rectified mains) or to a change in the load voltage. The reference letter B indicates the input-output voltage gap. The reference letter C indicates where the monitor load (current) increases. The preconverter drops the output voltage to minimize the voltage gap. At point C, more power consuming parts are switched on in the monitor 100, resulting in higher current. The microcontroller 90 controls the PFC circuit 30 to drop down the PFC output voltage (See FIG. 4). The reference letter D indicates the point where the input voltage (mains) drops down, and the preconverter drops the output voltage. The voltage detector 20 detects it and drops the PFC output voltage via the microcontroller 90 to minimize the power loss.

It is possible to achieve a power factor correction and voltage preconverting for a certain input power range by controlling the time during which the PFC switch 36 (which is preferably an FET) is open and the time during which the PFC switch 36 is closed.

In the preconverter-type PFC design, the switch off-time of the PFC circuit 30" is increased to reduce an input-output voltage gap, which leads to a smaller switch duty cycle. Moreover, on-time losses of the switch are reduced and it is possible to use a smaller switch for the PFC switch 36. Further increasing duration off-time effects needed inductance. The inductance value can be lower and the inductor smaller and cheaper.

Optimizing of the preconverter-type PFC design can be realized in hardware or software. It is advantageous to use the microcontroller 90 to measure the input and output voltages, sensed current, etc., to calculate corresponding parameters to control PFC switching to achieve a good power factor and low PFC losses over a universal power supply mains voltage range, and to take care of the stability of the preconverter-type PFC design.

For example, PFC-controllers known in the art have capabilities to monitor such parameters as the input and output voltage of the PFC circuit 30 and current drawn by a load of the PFC circuit 30. It is also known in the art to convert sensed current to analogous voltage, which indicates load current. Alternatively, as shown in FIG. 3, the input voltage can be monitored from the voltage detector 20a, which in this embodiment can be, for instance, a resistive voltage divider to scale voltage suitable for an A/D converter. The control line from 20a provides information to the microcontroller 90 via the ports 331, 332 of the PFC controller 31 and via the isolator $I_3$, which can be used to read voltages which indicate parameters monitored by the PFC circuit 30. The parameters are fed to the output port 331, which can be three state port to allow the microcontroller 90 to read several parameters by one common line at different times. The microcontroller 90 has a software program that calculates optimized switching times, duty cycles and a stable controlling region for the PFC switch 36 of the PFC circuit 30. The input port 332 receives instructions from the microcontroller 90 to set the switching time and duty cycle of the PFC switch 36 suitable to minimize input-output voltage gap.

In FIG. 3, the additional isolator 13 enables two way communication between the microcontroller 90 and the PFC circuit 30". One advantage of this design is that the follower-type PFC control can share the resources of the microcontroller 90, so an additional separate processing unit on the primary side is not needed for controlling the PFC circuit 30". The microcontroller 90 preferably comprises A/D converters (not shown) to convert received data, which can be in an analog form, into a digital form. The microcontroller 90 can send processed data to the PFC controller 31" to take care of minimized input-output voltage cap and stability of the PFC circuit 30". The microcontroller 90 can also be used to control other primary side properties of the display monitor power supply like, slow start of the power supply, protection of the power supply, power save functions, etc.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:

1. A display monitor power supply circuit having a primary side with a power factor correction circuit, a secondary side with a display monitor, and an isolation interface arranged between and isolating the primary side from the secondary side,
    characterized in that the secondary side has a microcontroller for controlling the display monitor and for providing a power correction circuit control signal to the power factor correction circuit for controlling a power correction factor of the display monitor power supply circuit.

2. A display monitor power supply circuit according to claim 1, characterized in that the power correction circuit control signal automatically switches the power factor correction circuit to an off state during a power save state.

3. A display monitor power supply circuit according to claim 2, characterized in that the power correction circuit control signal activates an off state during a power save state by switching off a power supply of the power factor correction circuit.

4. A display monitor power supply circuit according to claim 3, characterized in that
    the isolation interface includes a main power supply circuit that provides a supply voltage to the power factor correction circuit; and
    the isolation interface includes an isolator circuit that responds to the power correction circuit control signal for switching the main power supply circuit and providing the supply voltage to the power factor correction circuit.

5. A display monitor power supply circuit according to claim 4, characterized in that the main power supply circuit includes a transformer with a winding and includes a diode connected in series with the winding.

6. A display monitor power supply circuit according to claim 4, characterized in that
    the primary side includes a mains rectifier for providing a main rectifier signal;
    the primary side includes a voltage detector coupled between the mains rectifier and the power factor correction circuit, the voltage detector responding to the main rectifier signal, for providing a voltage detection control signal;
    the power factor correction circuit includes a power factor correction controller circuit and a power factor correction switch; and
    the power factor correction switch responds to the voltage detection control signal, for providing the supply voltage via the power factor correction switch to the power factor correction controller circuit.

7. A display monitor power supply circuit according to claim 1, characterized in that the isolation interface provides a supply voltage directly to the power factor correction circuit.

8. A display monitor power supply circuit according to claim 7, characterized in that
    the isolation interface includes a main power supply circuit that provides the supply voltage to the power factor correction circuit; and
    the isolation interface includes an isolator circuit that responds to the power correction circuit control signal for switching the main power supply circuit and providing the supply voltage to the power factor correction circuit.

9. A display monitor power supply circuit according to claim 1, characterized in that the primary side provides a communication signal to the microcontroller enabling two-way communication between the primary side and the microcontroller to fully control the power factor correction circuit.

10. A display monitor power supply circuit according to claim 9, characterized in that the isolation interface includes an isolator circuit for two-way communication signals between the primary side and the microcontroller to fully control the power factor correction circuit.

11. A display monitor power supply circuit according to claim 1, characterized in that the primary side has a mains rectifier and has a voltage detector coupled between the mains rectifier and the power factor correction circuit.

12. A display monitor power supply circuit according to claim 1, characterized in that the secondary side has at least one display monitor deflection circuit and a standby power circuit, both coupled to and controlled by the microcontroller.

13. A display monitor power supply circuit according to claim 1, characterized in that the isolation interface has a main power supply and a standby power supply.

14. A display monitor power supply circuit according to claim 1, characterized in that the main power supply has a transformer connected by a switch to a switching mode power supply controller and has an isolator circuit coupled between the microcontroller and the switching mode power supply controller.

15. A display monitor power supply circuit according to claim 1, characterized in that the microcontroller is a common controller that controls both user interface functions as well as power factor correction circuit functions.

16. A method for controlling a power factor correction circuit in a display monitor power supply circuit having a primary side with a power factor correction circuit, a secondary side with a display monitor, and an isolation interface arranged between and isolating the primary side from the secondary side, characterized in that the method comprises the steps of:
arranging a microcontroller on the secondary side for controlling the display monitor; and
providing a power correction circuit control signal from the microcontroller to the power factor correction circuit for controlling a power correction factor of the display monitor power supply circuit.

17. A method according to claim 16, characterized in that the method comprises the step of: automatically switches with the power correction circuit control signal the power factor correction circuit to an off state during a power save state.

18. A method according to claim 16, characterized in that the method comprises the step of: providing with the isolation interface a supply voltage directly to the power factor correction circuit.

19. A method according to claim 16, characterized in that the method comprises the step of: providing with the primary side a communication signal to the microcontroller enabling two-way communication between the primary side and the microcontroller to fully control the power factor correction circuit.

20. A method according to claim 16, characterized in that the method comprises the step of: arranging a mains rectifier on the primary side and coupling a voltage detector between the mains rectifier and the power factor correction circuit.

21. A method according to claim 16, characterized in that the method include the step of: arranging at least one display monitor deflection circuit and a standby power circuit on the secondary side, both coupled to and controlled by the microcontroller.

22. A method according to claim 16, characterized in that the method comprises the step of: providing the isolation interface with a main power supply and a standby power supply.

23. A method according to claim 16, characterized in that the method comprises the step of: providing the main power supply with a transformer connected by a switch to a switching mode power supply controller and with an isolator circuit coupled between the microcontroller and the switching mode power supply controller.

24. A method according to claim 16, characterized in that the method comprises the step of: using the microcontroller as a common controller to control both user interface functions as well as power factor correction circuit functions.

* * * * *

UNITED STATES PATENT AND TRADEMARK OFFICE
CERTIFICATE OF CORRECTION

PATENT NO. : 6,229,724 B1
DATED : May 8, 2001
INVENTOR(S) : Virtanen

It is certified that error appears in the above-identified patent and that said Letters Patent is hereby corrected as shown below:

<u>Title page,</u>
Item [54], Please delete the title in its entirety and insert -- DISPLAY MONITOR POWER SUPPLY CIRCUIT FEATURING SECONDARY SIDE MICROCONTROLLER FOR CONTROLLING A PRIMARY SIDE POWER FACTOR CORRECTION CIRCUIT --.

Signed and Sealed this

Twenty-seventh Day of November, 2001

Attest:

NICHOLAS P. GODICI
Attesting Officer     Acting Director of the United States Patent and Trademark Office